Patented Aug. 20, 1940

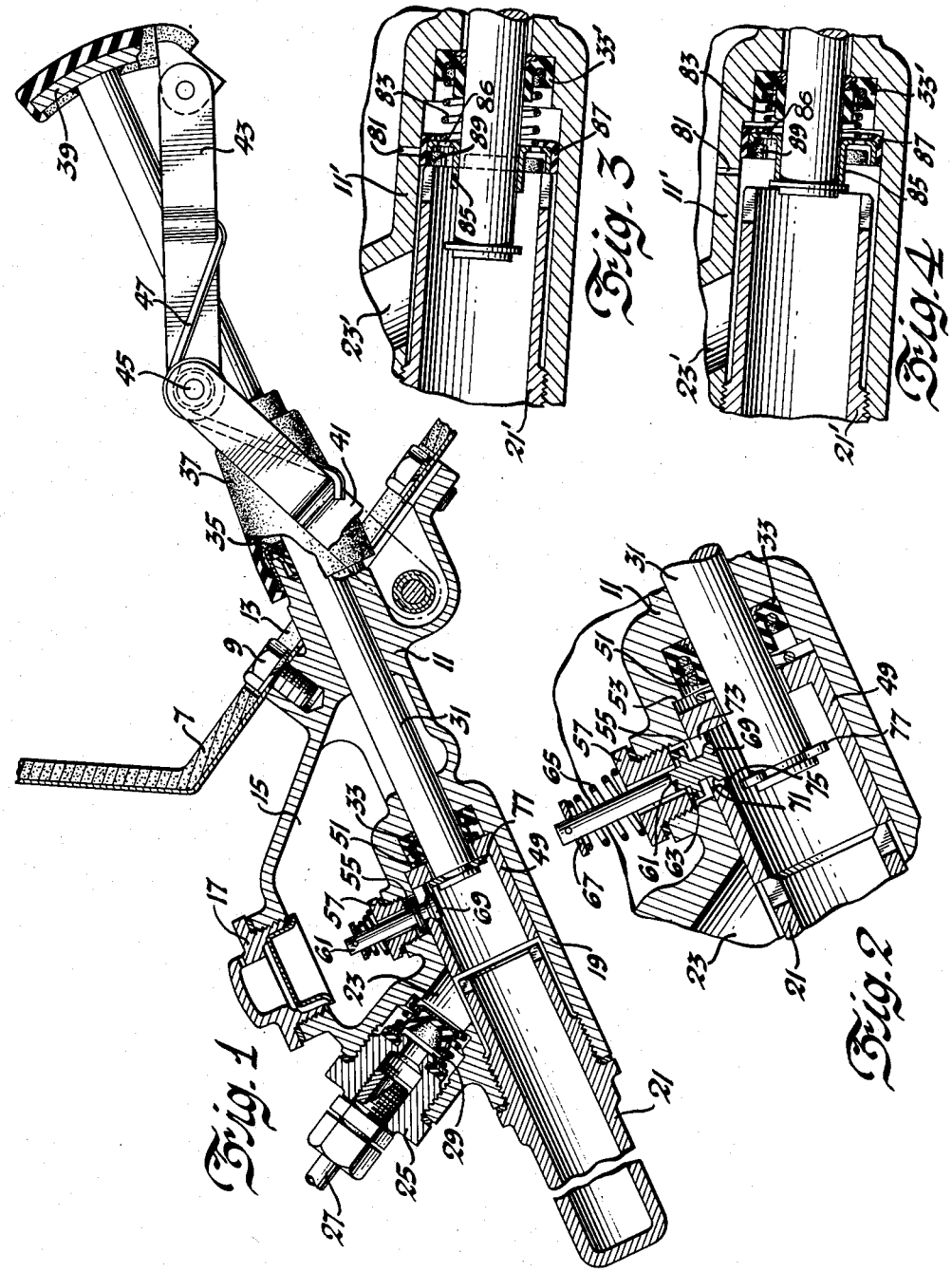

2,212,248

UNITED STATES PATENT OFFICE 2,212,248

MASTER CYLINDER FOR HYDRAULIC BRAKES

Olaf Rasmussen, Dayton, Ohio, assignor to General Motors Corporation, Detroit, Mich., a corporation of Delaware Application September 28, 1938, Serial No. 232,071

2 Claims. (Cl. 60—54.6)

This invention relates to mechanisms for transmitting manually applied forces through the instrumentality of fluid columns to perform work. Such systems are in common use for applying brakes. These systems employ a master cylinder within which the movement of the fluid column is initiated, and, associated with the master cylinder, is a reservoir adapted to communicate with the master cylinder under certain conditions of use. The present invention is more especially concerned with the control of the passage between the master cylinder and the reservoir in such systems. It has been designed particularly for an installation in connection with hydraulic brakes but it may be used in installations where the movable column is used to release clutches, shift gears or do other useful work.

The object of the invention is to improve the control of the passage between the reservoir and the master cylinder. A secondary object is the accomplishment of the major object by the use of an assembly of mechanical parts which shall be both effective and comparatively inexpensive. Other objects and advantages will be understood from the following description.

In the drawing:

Figure 1 is a longitudinal sectional view showing a master cylinder and reservoir with the invention embodied therein.

Figure 2 is a similar section of a portion of Figure 1 but on an enlarged scale and with certain of the parts displaced from the position shown in Figure 1.

Figures 3 and 4 are longitudinal sections of a modified form, the two figures showing their movable parts in changed positions.

Referring to Figures 1 and 2, the numeral 7 is applied to the floor of the operator's compartment of a motor vehicle. Secured to the floor by fastening means 9 is a casting 11 which projects through a floor board opening 13. This casting 11 is formed with a chamber or reservoir 15 closed by a removable cover 17. The casting also includes a cylindrical portion 19. Threaded into portion 19 is a closed tubular extension 21. The parts 19 and 21 form the master cylinder of the hydraulic system. The master cylinder has an opening 23 to afford communication between the master cylinder and the several brake cylinders. To that end the outlet opening 23 has threaded therein a plug 25 to which is secured a conduit 27. Associated with the plug there is shown a valve 29. Such valves are sometimes used to maintain a limited degree of pressure in the conduit and wheel cylinders when the plunger of the master cylinder is released. The valve need not be further described for the reason that it is no part of this invention.

The master cylinder is of that kind wherein fluid is displaced by the movement of a plunger 31 reciprocable therein. The plunger carries no sealing cup sliding along the cylinder wall but is sealed by a reinforced rubber cup as at 33 at the end of the cylindrical portion 19. The plunger projects through that part of casting 11 which extends through the floor 7 and is sealed as at 35 and is provided with a dust guard 37. The end of the plunger carries a foot pad 39. Jointed linkage 41 and 43 is shown. This linkage functions to prevent rotation of the plunger under the foot of the operator. At the joint 45 is a spring 47 which surrounds the joint and has its ends in engagement with the links 41 and 43. The spring is stressed as the plunger is pressed into the master cylinder and it serves as a retracting spring for the plunger when manual pressure is removed.

Within the upper end of the cylinder 19 is slidably mounted a cup 49. This cup is pressed forward by a spring 51 seated against the seal 33 and its movement is limited when its end wall engages the extreme end of the extension 21. The cup 49 has, therefore, a limited sliding movement engaging, as stated, the end of the extension 21 at one end of its movement and a shoulder 53 at the other end of its movement.

The wall of casting 11 between the reservoir and the master cylinder is formed with a passage 55 into which is threaded a plug 57. The plug is apertured to provide clearance between the wall of its aperture and the stem of a valve 61. The valve carries a sealing ring 63 adapted to seat against the bottom of plug 57 around its aperture under the influence of a spring 65 seated upon the plug and engaging an abutment 67 secured to the valve stem. The valve has a head 69 formed with a tapering surface 71. This head is located within an opening 73 in the wall of cup 49. The opening 73 is formed at one part of its periphery with a tapered wall 75 which taper is intended to engage the tapered head of the valve and to push it inwardly against the action of spring 65 when the cup 49 moves toward the upper end of the master cylinder. Since this movement opens the valve communication is established between the reservoir and the master cylinder. The movement of the cup is affected by the action of spring 47 as it withdraws the plunger 31. During such movement of the plunger an abutment 77 carried thereby picks up the bottom wall of the cup 49 and moves it against the resistance of spring 51.

Figure 1 shows the positions assumed by the parts when the brake is released. To apply the brakes the plunger is pressed downwardly into the master cylinder. Fluid is forced therefrom through the conduit 27 to the wheel cylinders. When the pressure on the pad is relieved the plunger is returned under the influence of spring 47. It may be that the plunger returns too rapidly to permit the fluid from the wheel cylinders to overcome the tendency to vacuum in the master cylinder. If such a low pressure becomes appreciable it will cause the valve to open against the resistance of spring 65 and fluid will flow from the reservoir to the master cylinder. When the plunger approaches its outward limit it picks up and moves the cup 49 as stated above, moving it from the position shown in Figure 2 to the position shown in Figure 1. In the process of so moving the cup its beveled edge 75 engages the angular face of the valve 16 and opens the valve in a way which will be obvious upon inspection of the drawing.

Figures 3 and 4 show a modified form. In these forms the casting 11' corresponds to casting 11 in Figure 1. The extension 21' corresponds to extension 21. The opening for discharge to the conduit is shown at 23'. Instead of the valved communication between the reservoir and the master cylinder there is a communicating passage 81. A spring 83 is seated against the washer 33' as in Figure 1 and forces a metal cup 85 against the end of the extension 21'. In the cup 85 are openings 86 permitting free passage of fluid. The metal cup carries a flanged sealing member, of rubber or the like, 87. The wall of the metal cup may have recessed portions 89 to permit the rubber to be deflected inwardly through a part of the wall of the cup. When the plunger is advanced into the cylinder the cup with its seal covers the opening 81 and the movement of the plunger displaces fluid from the master cylinder through the conduit. When the plunger is in retracted position as shown by Figure 4 free communication between the reservoir and the master cylinder may occur. When the plunger is being advanced the spring 83 causes the passage 81 to be closed. As the plunger advances pressure in the master cylinder tends to increase and no fluid may pass to the reservoir. When the plunger withdraws any tendency to vacuum is overcome by the passage of fluid from the reservoir through communicating duct 81, the rubber cup being deflected as explained above. When the pressure is fully withdrawn free communication between the reservoir and master cylinder is reestablished.

I claim:

1. A master cylinder, a plunger reciprocable therein, a reservoir, there being a passage between said reservoir and cylinder, a valve to control said passage, and means engaged by and movable with said plunger to open said valve in the retracted position of the plunger, said means including a cup having an aperture in its wall, yielding means to move said cup to a position wherein it is inoperative upon said valve, the wall of said operture being adapted to engage the head of said valve to open the same when the cup is moved by the plunger to its retracted position.

2. A master cylinder, a plunger reciprocable therein, a reservoir, there being a passage between said reservoir and cylinder, a valve to control said passage, and means engaged by and movable with said plunger to open said valve in the retracted position of the plunger, said means including a cup having an aperture in its wall, yielding means to move said cup to a position wherein it is inoperative upon said valve, the wall of said aperture being adapted to engage the head of said valve to open the same when the cup is moved by the plunger to its retracted position, the wall of said aperture and head of said valve having cooperating angular faces.

OLAF RASMUSSEN.